United States Patent
Mora et al.

(10) Patent No.: US 11,812,761 B2
(45) Date of Patent: Nov. 14, 2023

(54) SOLUBLE COFFEE POWDER

(71) Applicant: SOCIETE DES PRODUITS NESTLE S.A., Vevey (CH)

(72) Inventors: Federico Mora, Morges (CH); Daniel Cotter, Valeyres-sous-Ursins (CH); Aleksander Robaszkiewicz, Lausanne (CH); Xiaoping Fu, Dublin, OH (US); Julien Dupas, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 200 days.

(21) Appl. No.: 17/427,687

(22) PCT Filed: Feb. 3, 2020

(86) PCT No.: PCT/EP2020/052604
§ 371 (c)(1),
(2) Date: Aug. 2, 2021

(87) PCT Pub. No.: WO2020/161068
PCT Pub. Date: Aug. 13, 2020

(65) Prior Publication Data
US 2022/0346402 A1    Nov. 3, 2022

Related U.S. Application Data

(60) Provisional application No. 62/801,177, filed on Feb. 5, 2019.

(30) Foreign Application Priority Data

Mar. 14, 2019    (EP) ..................................... 19162736

(51) Int. Cl.
*A23F 5/30* (2006.01)
*A23F 5/38* (2006.01)

(52) U.S. Cl.
CPC . *A23F 5/30* (2013.01); *A23F 5/38* (2013.01)

(58) Field of Classification Search
CPC ...................................... A23F 5/30; A23F 5/38
See application file for complete search history.

(56) References Cited

U.S. PATENT DOCUMENTS 3,399,061 A  *  8/1968  Lutz ......................... A23F 5/32
                                                        426/385
3,493,388 A  *  2/1970  Hair ......................... A23F 5/36
                                                        426/453
(Continued)

FOREIGN PATENT DOCUMENTS

| EP | 0090561 | 10/1983 |
| EP | 0090562 | 10/1983 |
| GB | 2119625 | 11/1983 |

OTHER PUBLICATIONS

Office Action Received for Application No. 202080008142.6, dated Jun. 21, 2023, 8 Pages of Official Copy.

*Primary Examiner* — Anthony J Weier
(74) *Attorney, Agent, or Firm* — K&L Gates LLP

(57) ABSTRACT

The present invention relates to a soluble beverage powder of dried coffee extract. In particular to a soluble coffee powder having a gold appearance. Further aspects of the invention are a powder mix for preparing a beverage and a process for making a soluble beverage powder.

15 Claims, 1 Drawing Sheet

(56) References Cited

U.S. PATENT DOCUMENTS

| | | | | |
|---|---|---|---|---|
| 3,493,389 | A | * | 2/1970 | Hair .......................... A23F 5/36 426/388 |
| 3,573,060 | A | * | 3/1971 | Casten et al. ............. A23F 5/32 62/347 |
| 3,821,430 | A | * | 6/1974 | Reeves et al. ............ A23F 5/28 426/453 |
| 3,843,824 | A | * | 10/1974 | Roselius ............ B01D 11/0203 426/427 |
| 4,313,265 | A | * | 2/1982 | Dwyer, Jr. ................ A23F 5/32 426/387 |
| 4,594,256 | A | * | 6/1986 | Zemelman ................ A23F 5/38 426/453 |
| 4,919,962 | A | * | 4/1990 | Arora ....................... A23F 5/285 426/651 |
| 5,341,648 | A | * | 8/1994 | Umemura .............. A23G 9/045 62/73 |
| 6,572,915 | B1 | * | 6/2003 | Drunen ................... A23F 5/243 426/594 |
| 2007/0259084 | A1 | * | 11/2007 | Gaonkar ................ C07H 13/06 426/417 |
| 2023/0089743 | A1 | * | 3/2023 | Fu .......................... A23F 5/385 426/594 |

* cited by examiner

SOLUBLE COFFEE POWDER

CROSS REFERENCE TO RELATED APPLICATIONS

The present application is a National Stage of International Application No. PCT/EP2020/052604, filed on Feb. 3, 2020, which claims priority to U.S. Provisional Patent Application No. 62/801,177, filed on Feb. 5, 2019, and European Patent Application No. 19162736.3, filed on Mar. 14, 2019, the entire contents of which are being incorporated herein by reference.

FIELD OF THE INVENTION

The present invention relates to a soluble beverage powder consisting of dried coffee extract. In particular to a soluble coffee powder having a gold appearance. Further aspects of the invention are a powder mix for preparing a beverage and a process for making a soluble beverage powder.

BACKGROUND OF THE INVENTION

For many years producers of soluble coffee have sought to improve the acceptance of this type of coffee versus roast and ground coffee. Much effort has gone into optimizing the flavour and aroma of soluble coffee and, due to the success of these technical advances, today some soluble coffees are marketed as premium products. Premium products are products that the consumers consider to be superior and particularly luxurious.

Advances in the appearance of soluble coffee have however been slower. There is a need for technologies that can deliver a soluble coffee having a premium appearance, for example to accompany a premium taste and aroma and enhance the consumer experience in terms of visual identity. In many countries, regulations require that pure soluble coffee can only consist of coffee. This provides challenges in providing a novel and appealing appearance as for example the inclusion of a coloured pigment would not be permitted.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

SUMMARY OF THE INVENTION

An object of the present invention is to improve the state of the art and to provide an improved technical solution to the provision of premium appearance in soluble beverage powders. The object of the present invention is achieved by the subject matter of the independent claims. The dependent claims further develop the idea of the present invention.

Accordingly, the present invention provides in a first aspect a soluble beverage powder consisting of dried coffee extract, the powder having a colour difference $\Delta E$ from gold below 100. In a second aspect, the invention relates to a powder mix for preparing a beverage comprising the soluble beverage powder of the first aspect. A third aspect of the invention relates to a process for making the soluble beverage powder of the first aspect, the process comprising providing a coffee extract having a total solids content of less than 25% and drying the coffee extract. A still further aspect of the invention is a process for making a soluble beverage powder, the process comprising:

i. providing a coffee extract having a total solids content of less than 25%;
ii. freezing the coffee extract having a total solids content of less than 25% by unidirectional freezing;
iii. breaking-up the frozen coffee extract to a $D_{4,3}$ particle size from 0.05 mm to 10 mm; and
iv. drying the frozen coffee extract.

It has been surprisingly found by the inventors that a coffee extract can be dried in such a way as to produce a soluble coffee beverage powder with the appearance of the precious metal gold. Gold has been associated with wealth and luxury throughout history. Gold has a distinctive appearance, having both a gold hue and a specular reflection characteristic of polished metals. The inventors surprisingly found that drying a coffee extract in a process that favours the formation of plates of dried coffee arranged in separated parallel layers, produces a soluble beverage powder having a gold appearance, especially when the coffee extract is dried from a low total solids content.

DETAILED DESCRIPTION OF THE INVENTION

Figure 1:
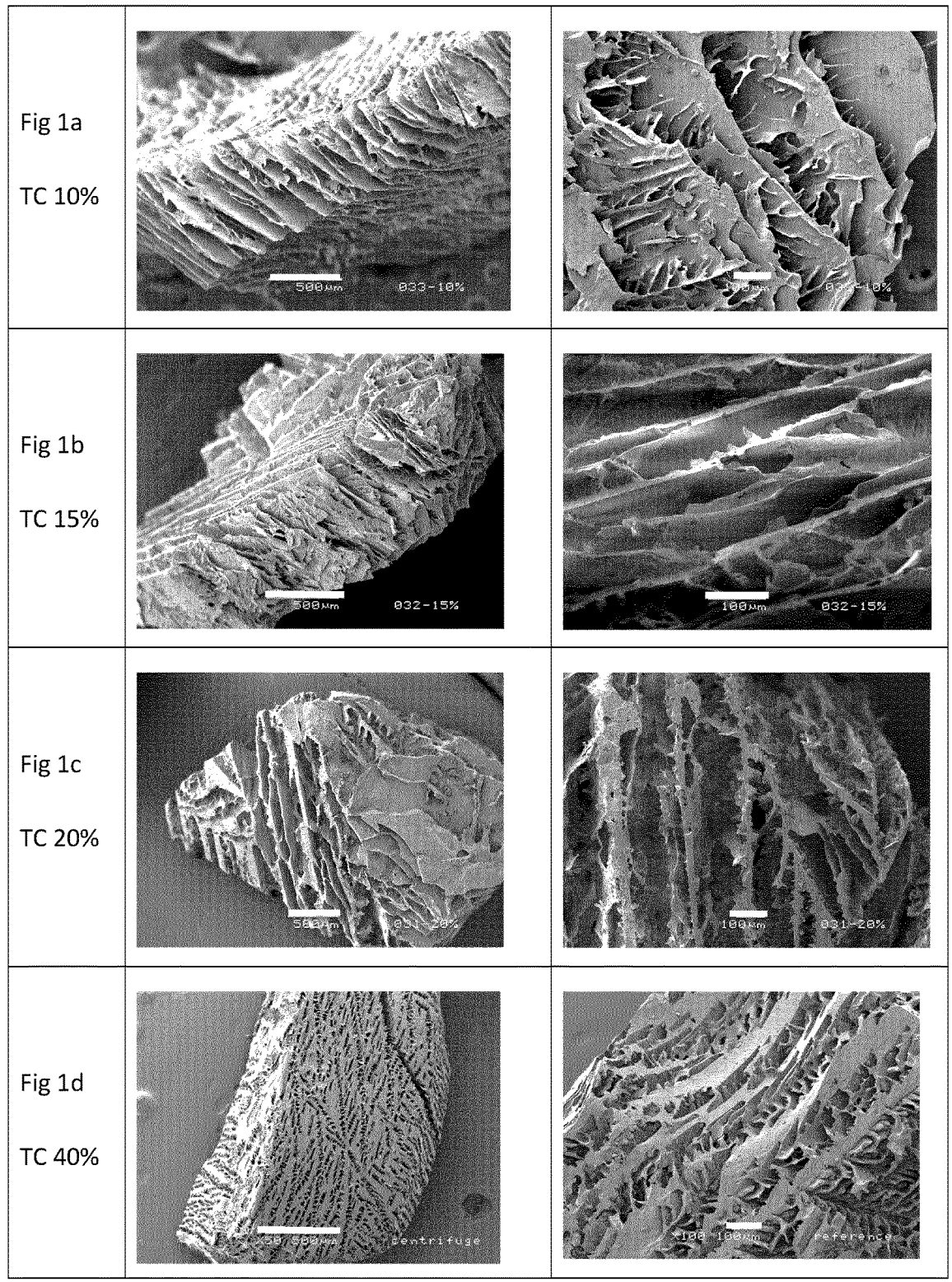
FIG. 1 shows scanning electron microscope images of soluble beverage powders prepared according to Example 1 where the total solids content (TC) of the coffee extract before drying was 10% (FIG. 1a), 15% (FIG. 1b), 20% (FIG. 1c) and 40% (FIG. 1d). The white scale bar represents 500 microns in the left-hand images and 100 microns in the right hand images.

Consequently the present invention relates in part to a soluble beverage powder consisting of dried coffee extract, the powder having a colour difference $\Delta E$ from gold below 100, for example below 95, 94, 93, 92, 91, 90, 89, 88, 87, 86, or 85.

The CIE 1976 L*a*b* (hereinafter CIELAB) colour scale is one method of measuring colour proposed by the Commission Internationale de l'Éclairage (CIE) [CIE Technical Report, Colorimetry $2^{nd}$ Edition, CIE 15.2-1986, corrected reprint 1996]. The CIELAB colour space is produced by plotting the quantities L*, a*, b* in rectangular coordinates. The L* coordinate of an object is the lightness intensity as measured on a scale from 0 (black) to 100 (absolute white). The a* and b* coordinates have no specific numerical limits. The parameter a* runs from pure green (negative a*) to pure red (positive a*), while b* runs from pure blue (negative b*) to pure yellow (positive b*). In the CIELAB colour space, colour difference may be calculated as a single value taking into account the differences between the L*, a* and b* values of two samples. The colour difference $\Delta E$ is calculated as follows:

$$\Delta E = \sqrt{(\Delta L^*)^2 + (\Delta a^*)^2 + (\Delta b^*)^2}$$

In the context of the present invention the colour gold is considered to have CIELAB values L*=86.9, a*=−1.9 and b*=87.1. This corresponds to the hexadecimal gold color code #ffd700 [web document <encycolorpedia.com/ffd700> accessed 30 Jan. 2019]. Therefore, $\Delta E$ from gold is calculated from measured values of L*, a* and b* as follows:

$$\Delta E \text{ from gold} = \sqrt{(L^*-87)^2 + (a^*+2)^2 + (b^*-87)^2}$$

Colour measurement may be performed by a commercial colour meter, such as a HunterLab Colorflex (CX1051) device, for example using the illuminant/observer setting D65/45°±2° with specular reflection excluded.

The dried coffee extract may comprise residual water, for example the dried coffee extract may comprise less than 5 wt. % water, for example less than 4 wt. % water.

Polished metals exhibit specular reflection, where incident light is reflected in a single outgoing direction. Specular reflection is sometimes referred to as gloss. An aspect of the invention provides a soluble beverage powder having specular reflection, for example a gloss at 60° geometry of at least 0.5 gloss units. The gloss may for example be measured with illuminant CIE-C and a CIE standard observer. The gloss may be measured using a BYK Gardner Micro-Tri-Gloss Meter, for example fitted with a support adapted to cosmetics powders.

In an embodiment, the soluble beverage powder of the invention having a colour difference ΔE from gold below 100 has a gloss at 60° geometry of at least 0.5 gloss units, for example at least 0.6 gloss units, for example between 0.5 and 1.7 gloss units. It is advantageous that the invention provides a material which, like gold metal, has a gold colour combined with specular reflection.

The inventors have found that different total solids of the coffee extract dried to produce the soluble beverage powder of the invention result in different skeletal densities of the powder. The skeletal density in turn is related to the colour of the powder. A gold colour may be obtained with low skeletal densities. In an embodiment, the skeletal density of the powder is from 0.7 to 1.4 g/ml, for example from 0.9 to 1.3 g/ml. The bulk density of the powder (for example measured by Hg porosimetry at 0.4 psia) is from 0.15 and 0.35 g/ml, for example from 0.18 to 0.30 g/ml.

According to the present invention the term density is the mass per unit volume of a material. For porous powder, three terms are commonly used; bulk density, skeletal density and tap density. Skeletal density (also termed the true or absolute density) is obtained when the volume measured excludes the pores and the void spaces between particles within the bulk sample. Bulk density is defined as the unit weight per unit volume of granule after the volume of the largest open pores (larger than a specific size, Hg extrusion pressure at 0.4 psia) has been subtracted. Tap density is the density obtained from filling a container with the sample material and vibrating it to obtain near optimum packing. Tap density includes interparticle voids in the volume whereas apparent density does not. In skeletal density, the volume used in the density calculation excludes both pores and void spaces between particles. The skeletal density may for example be measured by pulsed excitation, helium pycnometry or by mercury porosimetry.

In an embodiment, the powder comprises particles comprising at least one plate having a mean thickness of between 0.3 and 90 microns, for example between 1 and 60 microns, for example 5 and 50 microns. Plates of such thicknesses consisting of dried coffee extract are an example of a structure capable of providing gold colour and specular reflectance. For example, at least 30 wt. % of the soluble beverage powder of the invention may be particles comprising at least one plate having a mean thickness of between 0.3 and 90 microns. In the present invention, the term "plate" is used in the sense of a thin, flat sheet. For example a plate may be a smooth, flat, relatively thin, solid body of uniform thickness. In an embodiment, the at least one plate has a maximum dimension at least 10 times greater than its mean thickness, for example at least 50 times greater than its mean thickness. In an embodiment, the at least one plate has a dimension perpendicular to its maximum dimension which is at least 5 times greater than its mean thickness. In an embodiment, the at least one plate has a thickness that varies by less than a factor of four, for example less than a factor of two.

The degree to which particles comprised within the soluble beverage powder are plate-like (or "flaky") may be measured by profilometry. For example the projected area and the average height (thickness) of about 200 to 500 particles manually dispersed on a measuring platform where they naturally stand on their xy plan (i.e. along their two largest dimensions) may be measured. A suitable measurement device would be a Keyence VR5200 3D Profilometer. Fine particles may be removed prior to measurement. An index of flakiness is obtained by dividing the height by the square root of the projected area. An average index is calculated, weighing with the apparent size of particles. In an embodiment, the powder comprises particles having an average ratio of particle height to the square root of projected area less than 0.4, for example less than 0.35, for further example less than 0.3.

In an embodiment, two or more plates comprised within a particle are substantially parallel, for example at least 30 wt. % of the particles comprise two or more substantially parallel plates, for example three or more, for example four or more, for example five or more. In the context of the present invention, the term "substantially parallel" means that the plates are within 10 degrees of parallel to one another.

Without wishing to be bound by theory, the inventors believe that thin parallel plates of dried coffee extract effectively generate both a gold colour and specular reflectance. Light interacting with the thin plates experiences some selective absorption to provide the gold colour, but not so much absorption as to cause a dark brown appearance. Each plate that the light hits causes a degree of specular reflection, the parallel plates resulting in light that has passed through one plate and reached the surface of a second plate being reflected at approximately the same angle as the reflected light from the first plate, thus building an aligned specular gloss.

In an embodiment the two or more substantially parallel plates are separated by a gap, for example an air gap. The gap between two substantially parallel plates may be greater than or equal to the mean thickness of the plates, for example it may be greater than the mean thickness of the plates and less than 10 times the mean thickness of the plates. The substantially parallel plates may be in the form of a lamina structure. Such a structure under magnification looks like the laminar structure of a puff or filo pastry.

The two or more substantially parallel plates separated by a gap may have connecting elements between them, for example the powder particles may comprise a foam structure, with elongated pores between plates, the plates forming parallel walls of the foam.

In an embodiment, the soluble beverage powder is a glassy amorphous solid, for example a glassy amorphous solid at 20° C. A glassy amorphous solid exhibits a glass transition temperature. A glass transition temperature may be for example be measured by differential scanning calorimetry. The soluble beverage powder may be free from crystalline material, for example no crystals may be observed under a microscope using polarized light.

Another aspect of the invention relates to a powder mix for preparing a beverage, the powder mix comprising the soluble beverage powder of the invention. The powder mix may for example be a blend of coffee, sugar and milk powder which may be added to water to form a sweetened, white coffee. The powder mix may for further example be a mix of the soluble beverage powder of the invention with a conventional pure soluble coffee powder.

A further aspect of the invention provides a process for making the soluble beverage powder of the invention, the process comprising providing a coffee extract having a total solids content of less than 25% and drying the coffee extract. The total solids content refers to the mass of matter in a solution or a suspension. The total solids content of a coffee solution or suspension is defined as the weight of the dried coffee residue expressed as a percentage of the original coffee solution or suspension in weight/weight percent (w/w %).

A still further aspect of the invention provides a process for making a soluble beverage powder, the process comprising:
 i. providing a coffee extract having a total solids content of less than 25%;
 ii. freezing the coffee extract having a total solids content of less than 25% by unidirectional freezing;
 iii. breaking-up the frozen coffee extract to a $D_{4,3}$ particle size from 0.05 mm to 10 mm; and
 iv. drying the frozen coffee extract (for example the frozen coffee extract with a $D_{4,3}$ particle size from 0.05 mm to 10 mm).

During unidirectional freezing, water freezes into ice along a single plane. This may for example be performed by placing a container of liquid coffee extract in contact with a single flat freezing surface so that ice crystal growth occurs perpendicular to the freezing surface, or placing liquid coffee between multiple parallel cooling plates such that crystal growth occurs perpendicular to the parallel freezing surfaces. Without wishing to be bound by theory, the inventors believe that during unidirectional freezing of a low solids coffee extract, freeze concentration of the coffee solutes occurs and as the ice crystals form on the planar freezing front they create thin plates of coffee extract between them. After the ice sublimes during drying this results in a porous structure comprising thin parallel plates of dried coffee extract.

In an embodiment the freezing is performed using a slab freezer. In an embodiment the freezing is performed between parallel cooling plates, for example using a parallel plate freezer.

In an embodiment, drying the frozen coffee extract is performed under vacuum, for example drying under vacuum for between 1 and 4 hours.

Breaking-up the frozen coffee extract may be performed by milling, for example the frozen extract may be first crushed using a hammer mill and then ground using an grinder.

In an embodiment, the coffee extract is not gassed before freezing. Gassing the coffee extract before freezing disrupts ordered ice crystal growth.

A still further aspect of the invention provides a process for making a soluble beverage powder, the process comprising: providing a coffee extract having a total solids content of less than 25%; freezing the coffee extract having a total solids content of less than 25% at a temperature between −80 and −30° C. (for example between −50 and −30° C.) for a time between 1 and 12 hours; breaking-up the frozen coffee extract to a $D_{4,3}$ particle size from 0.05 mm to 10 mm; and drying the frozen coffee extract (for example the frozen coffee extract with a $D_{4,3}$ particle size from 0.05 mm to 10 mm).

The coffee extract may be provided by an extraction process that promotes a degree of hydrolysis. Chemical transformations in the roast and ground coffee such as hydrolysis may occur during extraction, for example cleavage of large molecular mass polysaccharides resulting in their solubilisation.

In an embodiment, roast and ground coffee is extracted at a total solids content of less than 25%, for example, providing a coffee extract having a total solids content of less than 25% may be done without diluting an extract having a total solids content greater than 25%. Extracting coffee at low total solids content, for example below 25%, provides a flavour and aroma closely replicating a beverage brewed from roast and ground coffee. Slow freezing further maintains the desirable aroma compounds. In an embodiment, roast and ground coffee is not hydrolyzed during the extraction process to provide the coffee extract.

In an embodiment the coffee extract is an extract from arabica coffee (*Coffea arabica*). In an embodiment the coffee extract is an extract from robusta coffee (*Coffea canephora*). In an embodiment the coffee extract is an extract from a blend of Arabica (*Coffea arabica*) and robusta coffee (*Coffea canephora*).

In an embodiment, the coffee extract is concentrated before freezing so as to speed up the freezing process. Preferably the coffee extract is concentrated without the application of heat so as to maintain as much as possible of the desired aroma. The coffee extract may be concentrated by membrane concentration, for example roast and ground coffee may be extracted at a total solids content below 12% and then the extract concentrated to a total solids content below 25%. The coffee extract may also be concentrated by freeze concentration, for example roast and ground coffee may be extracted at a total solids content below 12% and then the extract concentrated to a total solids content below 25%.

In an embodiment the process comprises:
 i. providing a coffee extract having a total solids content of less than 25%;
 ii. freezing the coffee extract having a total solids content of less than 25% by unidirectional freezing at a temperature between −80 and −30° C. (for example between −50 and −30° C.) for a time between 1 and 12 hours;
 iii. breaking-up the frozen coffee extract to a $D_{4,3}$ particle size from 0.05 mm to 10 mm; and
 iv. drying the frozen coffee extract (for example the frozen coffee extract with a $D_{4,3}$ particle size from 0.05 mm to 10 mm).

Values of $D_{4,3}$, $d_{90}$, and $d_{10}$ are common methods of describing a particle size distribution. The $d_{90}$ (sometimes written D90) is the diameter where 90% of the particles in the sample by volume have a diameter below that value. In the context of the present invention the $d_{90}$ by mass is equivalent to the $d_{90}$ by volume. Analogously, $d_{10}$ is the diameter where 10% of the particles in the sample by volume have a diameter below that value. The term "$D_{4,3}$ particle size" is used conventionally in the present invention and is sometimes called the volume mean diameter. The $D_{4,3}$, $d_{90}$, and $d_{10}$ value of powders may conveniently be measured by digital image analysis (such as using a Camsizer XT). Other measurement techniques for particle size distribution may be used depending on the nature of the sample. For example, dispersions are commonly measured using laser light scattering (such as by using a Mastersizer Malvern 3000), whereas powders with particle sizes large enough to conveniently be sieved may be measured by sieving.

Those skilled in the art will understand that they can freely combine all features of the present invention disclosed herein. In particular, features described for the product of the present invention may be combined with the process of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1: Coffee Powder Produced by Freezing on Tray Plates

Coffee extracts with a range of different total solids content values (5, 15, 35 and 45%) were placed in a rectangular tray container held at −40° C.

The extracts were allowed to solidify (1-4 h) after which they were crushed using a Frewitt hammer mill and ground using an Urschel grinder with 2 mm spacing.

The resulting frozen extract was placed into freeze drying trays and dried under vacuum, temperature ramps 100° C.→80° C.→60° C.→40° C. for three hours and then held for fifteen hours at 40° C. The 5 and 15% total solids content coffee extracts resulted in a gold and shiny powder.

The colour of the powders was measured using a HunterLab Colorflex (CX1051) device, with illuminant/observer setting D65/45°±2° and a 47 mm sample holder The colour difference $\Delta E$ from gold was calculated from measured values (three repeats) of L*, a* and b* as follows:

$$\Delta E \text{ from gold} = \sqrt{(L^*-87)^2 + (a^*+2)^2 + (b^*-87)^2}$$

The specular reflection of the samples was measured using a BYK Gardner Micro-Tri-Gloss Meter fitted with a support adapted to cosmetics powders. Gloss was measured with 60° incident light, CIE-C illuminant and a CIE standard observer. The instrument is calibrated with a standard black tile having an assigned a gloss value of 100 gloss units. To perform the measurement, powder was placed in the measuring cup, its surface levelled and then the glossmeter fitted, ensuring tight fitting to exclude room lighting. This procedure was repeated 6 times for each sample.

Results of distance from gold and gloss are shown in Table 1.

TABLE 1

| Sample | Particle size $D_{4,3}$ | $\Delta E$ from gold | 60° Gloss units |
| --- | --- | --- | --- |
| TC before drying of 1.4% | not measured | 75.2 | 1.63 |
| TC before drying of 5% | 358 microns | 84.8 | 0.65 |
| TC before drying of 15% | 716 microns | 90.1 | 0.52 |
| TC before drying of 35% | 964 microns | 89.9 | 0.22 |
| TC before drying of 45% | 1223 microns | 87.9 | 0.20 |

All samples were examined under a microscope with polarized light and no crystals were observed.

The sample with total solids content before drying of 5% was examined using a VR5200 3D Profilometer from Keyence. The powder was sieved before measurement to remove particles smaller than 500 microns. Average height (thickness) of about 200 to 500 particles manually dispersed on the measurement platform were measured. The particles naturally stand on their xy plan (i.e. along their two largest dimensions). An index of flakiness is obtained by dividing the height by the square root of the projected area.

$$\text{Flakiness index} = \frac{\text{Averaged particle height}}{\sqrt{\text{particle projected area}}}$$

$$\text{Size weighted flakiness index} = \frac{\sum \text{Flakiness index} \times \sqrt{\text{projected area}}}{\sum \sqrt{\text{projected area}}}$$

The sample was found to have a size-weighted average index of 0.25. A commercial freeze-dried soluble coffee was found to have an index of 0.42.

Example 2: Microscopy and Porosity Measurement of Coffee Powders

Soluble coffee powders were produced in the same manner as for Example 1 with total solids content values before drying of 10%, 15%, 20% and 40%. The 10%, 15% and 20% total solids content coffee extracts resulted in a gold and shiny powder.

Scanning electron microscopy was used to examine the powders. The SEM images are shown in FIG. 1. It can be observed that while the 10% (FIG. 1a), 15% (FIG. 1b) and 20% (FIG. 1c) total solids content coffee extracts result in a "flaky" microstructure with thin parallel plates, the 40% total solids content extract (FIG. 1d) led to a less porous structure with thicker walls.

Mercury porosimetery data was also obtained for the 10%, 15% and 20% TC samples to evaluate bulk density, skeletal density and open pore volume. An AutoPore IV 9520 was used for the structure evaluation (Micromeritics Inc. Norcrose, GA, USA). The operation pressure for Hg intrusion was from 0.4 psia to 9000 psia (with low pressure from 0.4 psia to 40 psia and high pressure port from 20 to 9000 pisa). The pore diameter under this pressure is ranged from 500 to 0.01 microns. The data reported was volume (ml/g) at different pore diameters (microns).

About 0.1 to 0.4 g of samples was precisely weighted and packed in a penetrometer (volume 3.5 ml, neck or capillary stem diameter 0.3 mm and stem volume of 0.5 ml).

After the penetrometer was inserted to the lower pressure port, sample was evacuated at 1.1 psia/min, then switch to a medium rate at 0.5 pisa and a fast rate at 900 μm Hg. The evacuating target was 60 μm Hg. After reaching the target, the evacuation was continued for 5 min before Hg is filled in.

The measurement was conducted in set-time equilibration. That is, the pressure points at which data are to be taken and the elapsed time at that pressure in the set-time equilibration (10 sec) mode. Roughly 140 data points were collected at the pressure ranges.

The volume of open pores per gram of product in the diameter range 0.001 to 500 microns (μm) gives the "open pore volume". Bulk density is defined as the unit weight per unit volume of granule after the volume of the largest open pores (larger than a specific size, Hg extrusion pressure at 0.4 psia) has been subtracted. A typical value for the largest pore included in the bulk density is 180 microns. Skeletal density is computed after the volume of all pores larger than about 0.005 microns has been excluded from the volume presumed occupied by the material. Results are shown in the table below:

TABLE 2

| Sample | Bulk density at 0.4 psia | Skeletal density | Total open pore volume |
|---|---|---|---|
| TC before drying of 10% | 0.19 g/ml | 0.93 g/ml | 4.21 ml/g |
| TC before drying of 15% | 0.24 g/ml | 1.07 g/ml | 3.17 ml/g |
| TC before drying of 20% | 0.30 g/ml | 1.21 g/ml | 2.49 ml/g |

Example 3: Gold and Shiny Coffee Powder Produced by Freezing Between Parallel Plates Roast and ground arabica coffee was extracted at a total solids content of 10%. Membrane concentration was used to increase the total solids content to 20%. The extract was slowly freeze-dried between parallel plates at temperature between −35 C and −45° C. for 12 hours. No gassing was applied. The freeze dried powder had a particle size around 1.5 mm and had a gold colour and a shiny appearance.

The invention claimed is:

1. Soluble beverage powder consisting of dried coffee extract, the powder having a colour difference ΔE from gold below 100, a gloss at 60° geometry of at least 0.5 gloss units, wherein the skeletal density of the powder is from 0.7 to 1.4 g/ml, the powder comprises particles comprising at least one plate having a mean thickness of between 0.3 and 90 microns, and two or more plates comprised within a particle are substantially parallel.

2. The soluble beverage powder according to claim 1 having a gloss at 60° geometry between 0.5 and 1.7 gloss units.

3. The soluble beverage powder according to claim 1, wherein the skeletal density of the powder is from 0.9 to 1.3 g/ml.

4. The soluble beverage powder according to claim 1, wherein the powder comprises particles comprising at least one plate having a mean thickness of between 5 and 50 microns.

5. The soluble beverage powder according to claim 1, wherein the two or more substantially parallel plates are separated by a gap.

6. The soluble beverage powder according to claim 1 wherein the powder is a glassy amorphous solid.

7. Powder mix for preparing a beverage comprising a soluble beverage powder consisting of dried coffee extract, the powder having a colour difference ΔE from gold below 100, a gloss at 60° geometry of at least 0.5 gloss units, wherein the skeletal density of the powder is from 0.7 to 1.4 g/ml, the powder comprises particles comprising at least one plate having a mean thickness of between 0.3 and 90 microns, and two or more plates comprised within a particle are substantially parallel.

8. A process for making a soluble beverage powder, the process comprising:
   i. providing a coffee extract having a total solids content of less than 25%;
   ii. freezing the coffee extract having a total solids content of less than 25% by unidirectional freezing at a temperature between −50 and −30° C. for a time between 1 and 12 hours;
   iii. breaking-up the frozen coffee extract to a D4,3 particle size from 0.05 mm to 10 mm; and
   iv. drying the frozen coffee extract.

9. The process according to claim 8 wherein the coffee extract is extracted at a total solids content of less than 25%.

10. The process according to claim 8 wherein the drying is performed under vacuum.

11. The process according to claim 8 wherein the freezing is performed between parallel cooling plates.

12. The soluble beverage powder according to claim 1, wherein a bulk density of the powder is between 0.15 to 0.35 g/ml.

13. The soluble beverage powder according to claim 1, wherein the powder comprises particles having an average ratio of particle height to the square root of projected area less than 0.4.

14. The soluble beverage powder according to claim 1, wherein at least 30 wt. % of the particles comprise two or more substantially parallel plates.

15. The soluble beverage powder according to claim 5, wherein the gap is greater than the mean thickness of the plates and less than 10 times the mean thickness of the plates.

* * * * *